United States Patent
Song et al.

(10) Patent No.: US 8,464,218 B2
(45) Date of Patent: Jun. 11, 2013

(54) METHOD PORT ARRANGEMENT AND CONFIGURATION METHOD THEREOF FOR ROBOT SOFTWARE COMPONENT

(75) Inventors: Byoung Youl Song, Daejeon (KR); Seung-Woog Jung, Daejeon (KR); Choul Soo Jang, Daejeon (KR); Sung Hoon Kim, Daejeon (KR); Hyun Kyu Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 837 days.

(21) Appl. No.: 12/613,990

(22) Filed: Nov. 6, 2009

(65) Prior Publication Data

US 2010/0161836 A1 Jun. 24, 2010

(30) Foreign Application Priority Data

Dec. 19, 2008 (KR) ........................ 10-2008-0130141

(51) Int. Cl.
*G06F 9/44* (2006.01)
*G06F 3/00* (2006.01)

(52) U.S. Cl.
USPC .............................................. 717/120; 710/8

(58) Field of Classification Search
None
See application file for complete search history.

(56) References Cited

U.S. PATENT DOCUMENTS

| 7,882,236 B2 | 2/2011 | Lovering et al. |
| 2005/0010925 A1 | 1/2005 | Khawand et al. |
| 2007/0031282 A1* | 2/2007 | Zucchelli et al. ............... 422/57 |
| 2007/0061799 A1* | 3/2007 | Kimmerly ...................... 717/168 |
| 2008/0109828 A1 | 5/2008 | Cho et al. |

FOREIGN PATENT DOCUMENTS

| EP | 1 901 211 A2 | 3/2008 |
| JP | 2002-149405 | 5/2002 |
| KR | 10-2004-0100562 | 12/2004 |
| KR | 10-2005-0108518 | 11/2005 |
| KR | 10-2006-0039433 | 5/2006 |
| KR | 10-2006-0089624 | 8/2006 |
| KR | 10-2008-0040104 | 5/2008 |

* cited by examiner

*Primary Examiner* — Hyun Nam
(74) *Attorney, Agent, or Firm* — Staas & Halsey LLP

(57) ABSTRACT

A configuration method of a method port arrangement for robot software component includes: generating a requester method port module and a provider method port module; generating a requester method module and a provider method module depending on application of a method module to be generated in the component; registering the requester method module in the requester method port module and the provider method module in the provider method port module; and registering, in a method port management module, the requester method port module and the provider method port module where the requester method module and the provider method module have been registered. The method further includes establishing the requester method port module to be operated by interconnecting the requester method port module and the provider method port module; and executing input and output operations to/from the requester method port or the provider method port depending on application of the component.

11 Claims, 4 Drawing Sheets

METHOD PORT ARRANGEMENT AND CONFIGURATION METHOD THEREOF FOR ROBOT SOFTWARE COMPONENT

CROSS-REFERENCE(S) TO RELATED APPLICATION

The present invention claims priority of Korean Patent Application No. 10-2008-0130141, filed on Dec. 19, 2008, which is incorporated herein by reference.

FIELD OF THE INVENTION

The present invention relates to a method port for providing an interface between software components operating in a robot, and more particularly, to a provider method port arrangement which provides an interface for methods to be offered by a component and a requester method port arrangement which provides an interface for methods to be used by a component, and its configuration method.

BACKGROUND OF THE INVENTION

It is known that the term "method port" refers to an IDL (interactive data language) of CORBA (a common object request broker architecture), which allows a component to access specific methods through a class.

Generally, in CORBA, a skeleton code is generated by an IDL compiler and methods are directly implanted on the code, or a code cooperating with separately implemented methods are written in the skeleton code to define an interface between software components. However, in this case, a user needs to newly create a skeleton code by the IDL compiler to correct the written code when the interface definition is changed.

To solve the above problem, a technique has been proposed, which separates an interface class from an actual data processing class under the assumption that each port functions as a transmission terminal for sending and receiving messages. This technique is implemented in a manner that CORBA is used as a transmission mechanism, data transmission is made by MsgPortClass, connection between modules is established by ConnPortClass, and each interface is defined by IDL, thereby avoiding change of a data processing part upon change of interface definition or change of an interface processing portion upon change of the data processing portion which is the defect of CORBA. However, this technique cannot be applied to cases where middlewares other than CORBA are employed.

As another proposal, there is a technique of dynamically establishing a connection between software components that are in operation by a dynamic connection manager. This technique is directed to a communication technique between respective ports of components operated in a software communication architecture (SCA) based system. More specifically, the technique allows the dynamic connection manager to execute a mapping between ports by using XML to properly cope with component down or replacement at run-time. This technique, however, has a shortcoming that lots of changes on code should be done upon change of interface definition because the interface and the data processing part are not separated from each other.

Further, the two techniques described above have a drawback that a developer needs to separately implement interfaces to access methods offered by software components although they have a same function, when accesses made by variety interfaces such as an interface from a manager, an interface from a user, and an interface from a monitor.

SUMMARY OF THE INVENTION

Therefore, present invention provides a method port implementation technique capable of improving the reliability of software development by separating a method port interface and a data processing part.

Further, the method port implementation technique supports a multiple interface function in which a method implemented in a component is registered in several interfaces.

The method port implementation technique performs a direct call for methods existing on the same host, and a remote call through message communications for methods on remote host without any change in the user source.

In accordance with an aspect of the present invention, there is provided a configuration method of a method port arrangement for robot software component, the method including: generating a requester method port module and a provider method port module; generating a requester method module and a provider method module depending on application of a method module to be generated in the robot software component; registering the requester method module in the requester method port module and the provider method module in the provider method port module; and registering, in a method port management module, the requester method port module and the provider method port module in which the requester method module and the provider method module have been registered.

The method further includes: establishing the requester method port module to be operated by interconnecting the requester method port module and the provider method port module; and executing input and output operations to/from the requester method port or the provider method port depending on application of the component.

In accordance with another aspect of the present invention, there is provided a method port arrangement for robot software component including: a provider method port module which includes a set of methods as specific functions to be provided by the component; a requester method port module which includes a set of methods as specific functions to be used by the component; a provider method module which is registered in the provider method port module to have one to one correspondence with respective methods provided by the component, and calls the respective methods through the provider method port module; and a requester method module which is registered in the requester method port module to have one to one correspondence with respective method interfaces provided by the requester method port module, and performs a direct call when the corresponding method interface is on a same host and a remote method call by sending a message over a network channel if the corresponding method interface is on a remote host.

In accordance with the aspects of the present invention, the configuration method of a method port arrangement improves the reliability of software development by separating a method port interface and a data processing part.

Further, the method port implementation technique supports a multiple interface function in which a method implemented in a component is registered in several interfaces, and provides multiple interface functions to use an interface suitable for each purpose so that a component's user can select an interface with various scopes and a method configuration suitable for the purpose.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
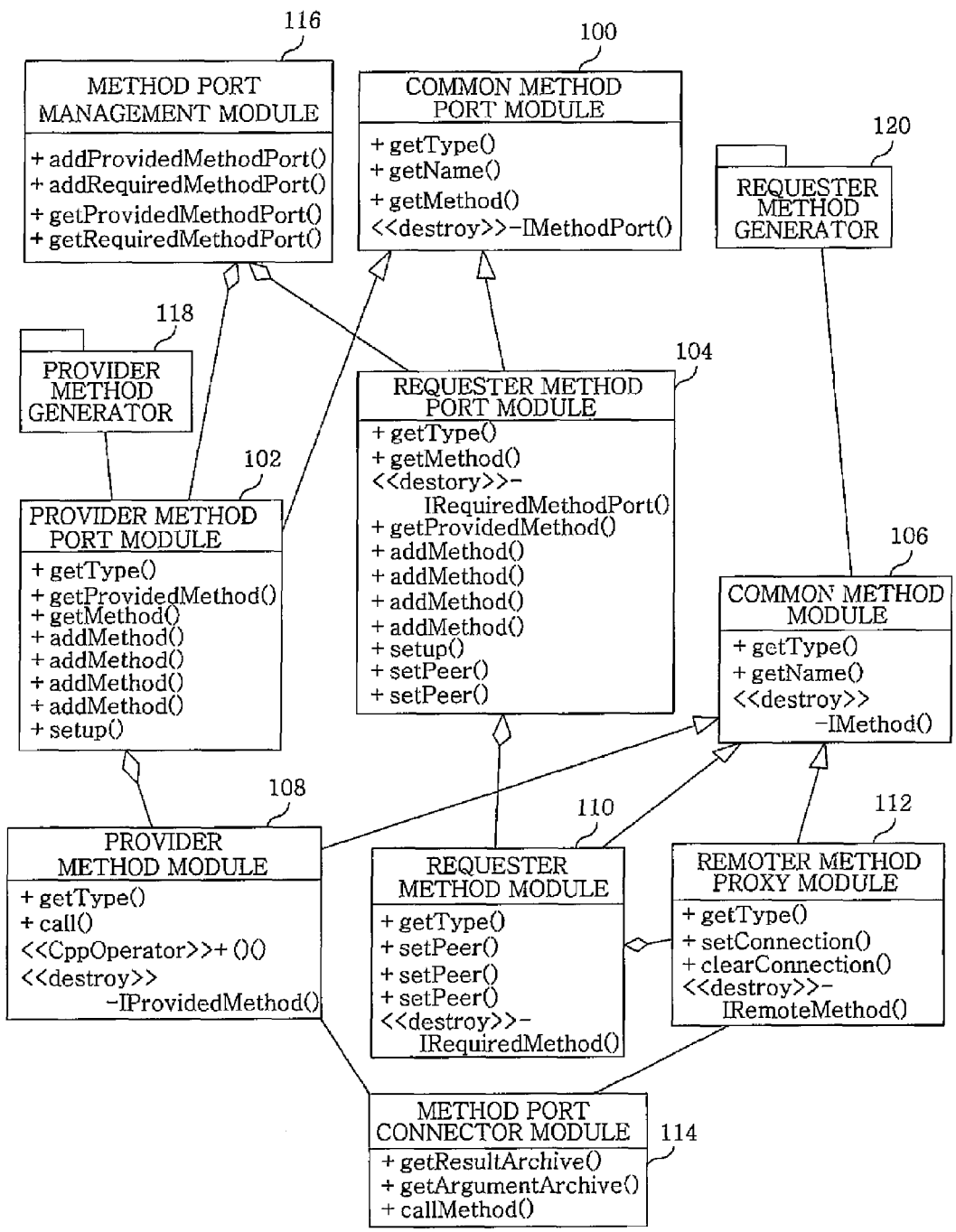
FIG. 1 shows a method port arrangement in accordance with an embodiment of the present invention.

FIG. 1 shows a configuration of a method port arrangement in accordance with an embodiment of the present invention.

The method port arrangement shown in FIG. 1 includes a common method port module 100, a provider method port module 102, a requester method port module 104, a common method module 106, a provider method module 108, a requester method module 110, a remote method proxy module 112, a method port connector module 114, a method port management module 116, a provider method generator 118, and a requester method generator 120.

The common method port module 100 serves to manage a provider method port and a requester method port in the same manner, the module 100 having common attributes owned by the provider method port and the requester method port. The common method port module 100 is used for accessing to the provider method port and the requester method port from outside thereof through a common interface, and performs a management function through one registry.

The provider method port module 102 includes a set of methods, which are specific functions to be offered by a component. The provider method port module 102 may exist on the component in several units. Therefore, a developer can provide a variety of interfaces without a significant change of implementation class.

The requester method port module 104 is used when a robot software component intends to use specific functions provided by another robot software component. This module 104 configures a requester method port based on method port information provided by the existing component if any, or configures a requester method port depending on a method configuration arbitrarily set by a user if there is no related information.

The common method module 106 serves to access to and manage a provider method and a requester method in the same manner. That is, the common method module 106, which has the same attributes as those owned by the provider method and requester method, accesses to or manages the provider and requester methods through the same interface. In particular, the common method module 106 completely separates a method implementation portion from a method calling portion so that a method calling can be performed even if a method to be used does not have information about an actually implemented class.

Each provider method module 108 has a one to one correspondence with each of methods offered by a component to call the respective methods through the method port. In addition, the provider method module 108 analyzes an encoded message transferred to the provider method module 108 over a network to obtain input parameters, and delivers the parameters to its actual method and then transmits the result back to an original remote caller. Especially, one provider method module 108 is registered in several provider method port modules 102 so that one method module can provide method calling functions through various interfaces.

Each requester method module 110 is has one to one correspondence with each of method interfaces offered by the requester method port. When the corresponding method provider is on the same host the request method module 110 performs a direct call, and when it is on a remote host, the request method module 110 performs a method call through a message communication. To this end, the requester method module 110 includes a setting portion for a local provider method and the remote method proxy module 112 for relaying with the remote provider method, thereby setting the provider method port. The remote method proxy module 112 is generated upon creation of the requester method, and serves to perform a message encoding and decoding function for remote method calling.

Therefore, it is possible to satisfy both cases where the provider method and the requester method are on the same host or on the remote hosts in advance since the provider method corresponding to the requester method will be determined in the execution step.

The method port connector module 114 is mainly used, when a provider method port of the another component corresponding to the requester method port is arranged at a remote host, and serves to configure a message format between ports for communications between the components on the remote hosts.

The method port management module 116 is installed within the component to manage the provider method port and the requester method port offered or used by the component, and processes a request for the provider method port from the outside or a search request for connection between ports.

The provider method generator 118 is to generate the provider method module from a particular method of instance of a specific class.

The requester method generator 120 is to generate the requester method module from a particular method of a specific class, together with the remote method module upon the creation of the requester method module.

Figure 2:
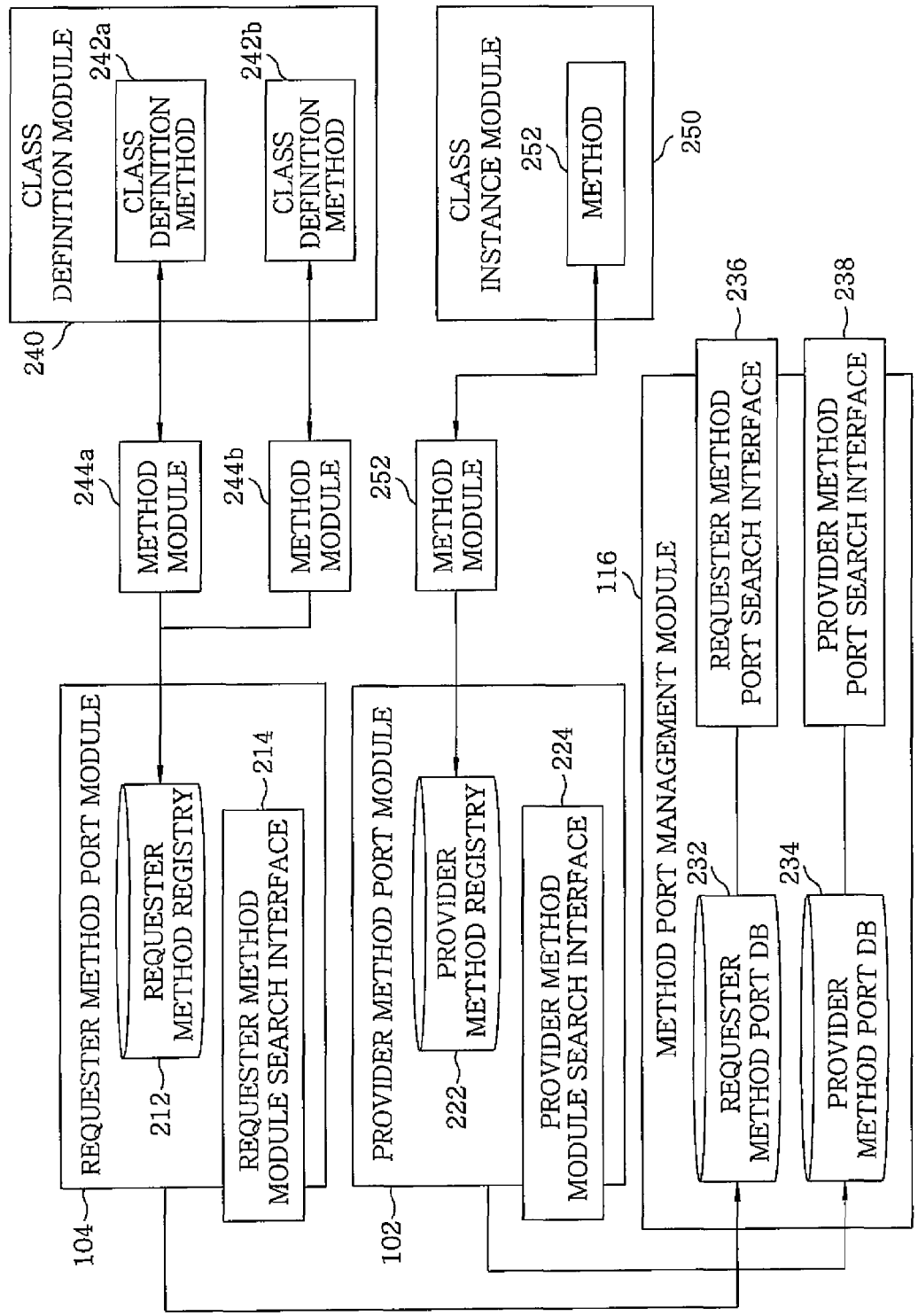
FIG. 2 provides a block diagram showing a configuration of a robot software component representing the relationship between respective modules in accordance with an embodiment of the present invention.

FIG. 2 illustrates a configuration of the relationship between respective modules of a method port arrangement in accordance with an embodiment of the present invention.

The modules illustrated in FIG. 2 are the requester method port module 104, the provider method port module 102, the method port management module 116, a class definition module 240, a class instance module 250 and the like.

The requester method port module 104 is provided with a requester method registry 212, and a requester method module search interface 214 for searching a specific method module from the requester method registry 212.

The provider method port module 102 is provided with a provider method registry 222, and a provider method module search interface 214 for searching a specific method module from the provider method registry 222.

The method port management module 116 is provided with a requester method port database (DB) 232 for managing information on a requester method port within the method port management module 116, a provider method port DB 234 for managing information on a provider method port therein, a requester method port search interface 236 for acquiring the requester method port, and a provider method port search interface 238 for acquiring the provider method port.

The class definition module 240 is provided with class methods on the class definition 242a and 242b, and method modules 244a and 244b corresponding to the class methods 242a and 242b, respectively.

The class instance module 250 is provided with a method 252 offered therein, and a method module 254 corresponding to the method 252.

Figure 3:
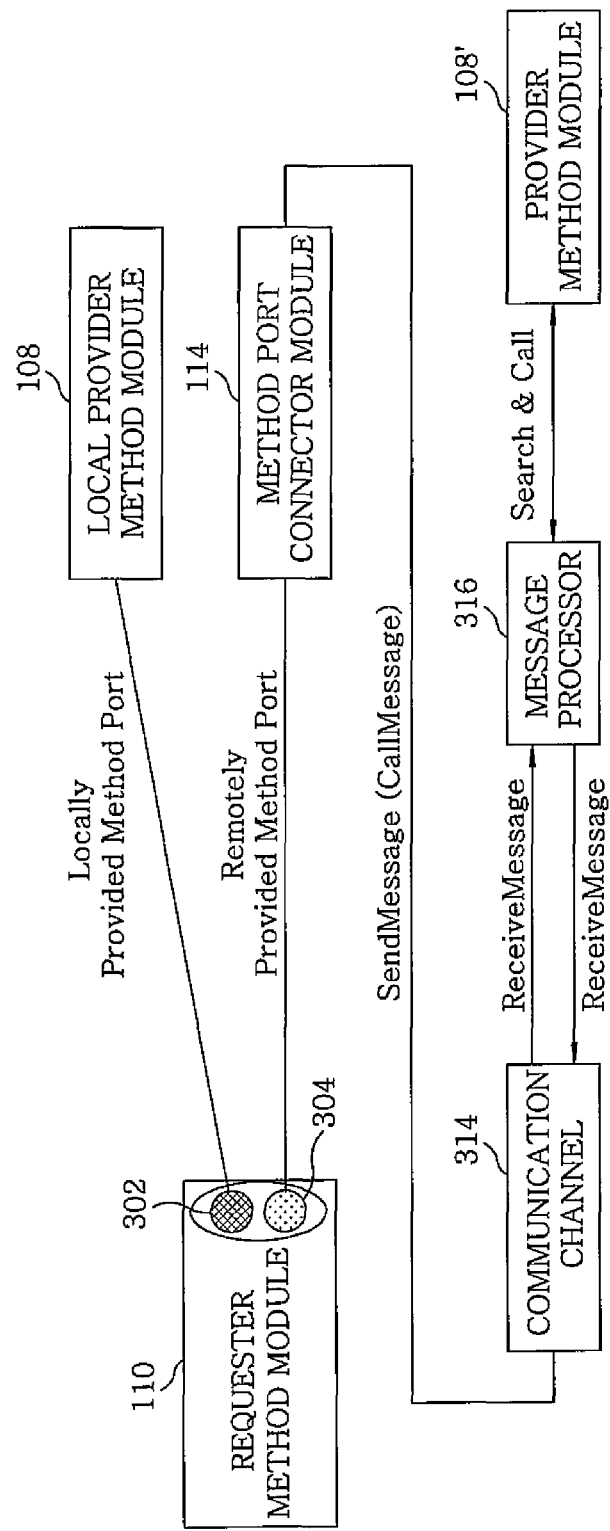
FIG. 3 describes the connection relation between the method modules in the method port arrangement shown in FIG. 1.

FIG. 3 describes the connection relation between the method modules in the method port arrangement in accordance with the present invention.

Referring to FIG. 3, there are illustrated the requester method module 110, the provider method module 108 corresponding to the requester method module 110, the method port connector module 114 for calling a remote method module and a remote provider method module 108' corresponding to the requester method module 110. The requester method module 110 includes a connection point 302 for connecting the requester method module 110 with the provider method module 108 and a remote method proxy module 304. Further, between the method port connector module 114 and the remote provider method module 108', a communication channel 314 for network communication and a message processor 316 for processing messages between ports at a remote host are provided.

Hereinafter, a configuration method of the method port arrangement for robot software in accordance with another embodiment of the present invention will be described in detail with reference to a flow chart depicted in FIG. 4.

Figure 4:
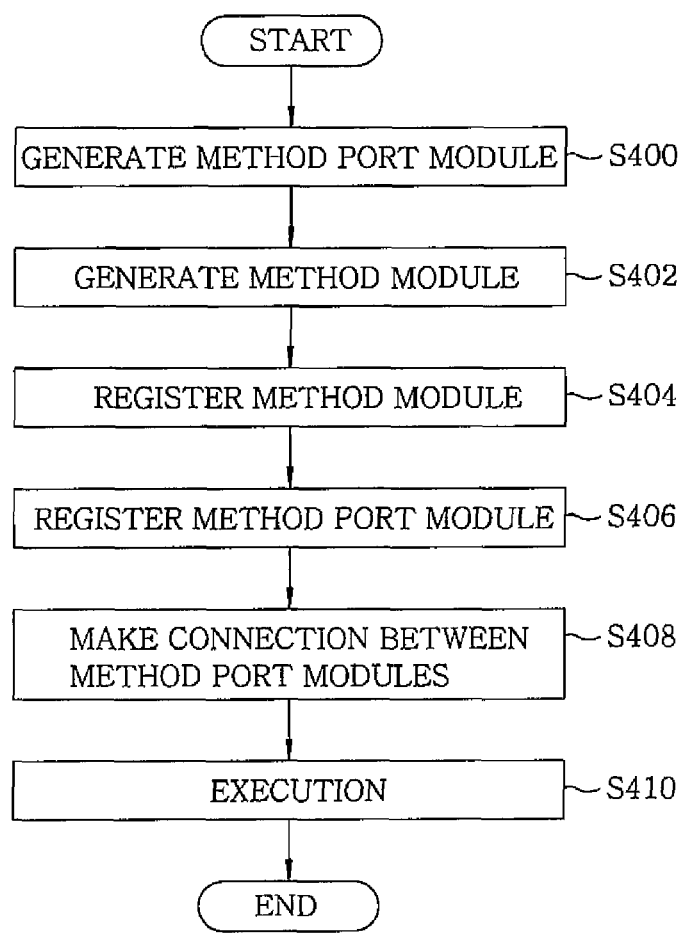
FIG. 4 illustrates a flow chart for explaining a configuration method of the method port arrangement in accordance with another embodiment of the present invention.

Referring to FIG. 4, in step S400, the requester method port module 104 or the provider method port module 102 is generated depending on the intended purpose.

Next, in step S402, if a method module to be generated is the requester method to be used by the component, the method modules 244a and 244b are generated to call the respective required methods 242a and 242b using the class definition module 240 through the requester method generator 120. At this time, only information on the type of the corresponding method is contained in the generated method modules 244a and 244b, and no information on the module where the method is actually implemented is contained therein.

Meanwhile, if the method module to be generated is the provider method to be provided by the component for the another component, the method module 254 is generated to call the method 252 to be provided from the outside of the component using the class instance module 250 through the provider method generator 118. At this time, information on the type of the corresponding method as well as information on the module where the method is actually implemented is contained in the generated method module 254.

Subsequently, in step S404, the method module 254 or the method modules 244a and 244b are registered in the provider method registry 222 of the provider method port module 102 or in the requester method registry 212 of the requester method port module 104, respectively. The registered method modules 244a and 244b or the registered method module 254 can be acquired from the outside through the requester or provider method module search interface 214 or 224 provided by the method port module 104 or 102, respectively.

Then, in step S406, upon completion of registration of the method modules 244a and 244b or the method module 254, the requester method port module 104 or provider method port module 102 is registered in the requester method port DB 232 or provider method port DB 234 in the method port management module 116, respectively. The method ports so registered can be acquired from the outside of the component through the requester method port search interfaces 236 or provider method port search interface 238 in the method port management module 116. Only one method port management module 116 is usually provided within the component, and is referenced when accessing to the provider method port modules 102 provided by the component from the outside thereof or when making a connection of the requester method port module 104 used by the component and a method port of the another component providing a corresponding actual function therefor.

Next, in order for the component to call a certain method offered by another the component, the component needs to use the requester method port module 104 that was generated in advance. When the requester method port is not connected to the provider method port of the another component associated with it, a required function cannot be used. Therefore, in step S408, the requester method port module 104 is connected to the corresponding provider method port module 102' in the another component. In this connection process, the connection itself is made on a method port basis, but its actual connection is established for each method module forming the method port.

More specifically, referring to FIG. 3 again, when the requester method port is connected to the provider method port on the same host, the requester method module 100 in the requester method port is connected directly to the local provider method module 108 existing on the same host through the connection point 302 with the provider method. At this time, the calling operation of the requester method module 110 is done similar to calling the local provider method module 108 in the another component directly.

When the requester method port is connected to the provider method port on another host, the method port connector module 114 as the connection information on the corresponding provider method port is set in the remote method proxy module existing in the requester method module 110 on the requester method port. By this, the future calling of the requester method module 110 is converted into a remote request message and transferred to the message processor 316 on another host over the network communication channel 314 to call the function of the corresponding provider method module 108'.

Finally, in step S410, after a series of registration, setting and connection operations on the method port have been completed, input and output operations to/from the method port are executed by the use of the component.

As described above, in accordance with the embodiments of the present invention, the method port interface and its actual implementation are separated from each other so that methods for calling specific functions on a component can be called even when respective classes of the methods are implemented in a different manner, and one method implementation on the component is registered in several interfaces so that multiple interface functions to use an interface suitable for each purpose are provided for the component's user to select an interface of various scopes and method configurations. In addition, a direct calling is executed for a method on the same host and a remote calling is executed through a message communication for a method on a remote host without any change on a user source, thereby enabling an optimal method calling regardless of where the component to be used is.

While the invention has been shown and described with respect to the preferred embodiments, it will be understood by those skilled in the art that various changes and modifications may be made without departing from the scope of the invention as defined in the following claims.

What is claimed is:

1. A configuration method of a method port arrangement for robot software component, the method comprising:
generating a requester method port module and a provider method port module;
generating a requester method module and a provider method module depending on application of a method module to be generated in the robot software component;
registering the requester method module in the requester method port module and the provider method module in the provider method port module;
registering, in a method port management module, the requester method port module and the provider method port module in which the requester method module and the provider method module have been registered;
establishing the requester method port module to be operated by interconnecting the requester method port module and the provider method port module; and
executing input and output operations to/from a requester method port or a provider method port depending on application of the robot software component.

2. The method of claim 1, wherein said generating a requester method module and a provider method module includes:
generating the requester method module based on a class definition when a method module to be generated is a requester method used by the robot software component; and
generating the provider method module based on a class instance when a method module to be generated is a provider method provided by the robot software component.

3. The method of claim 1, wherein the requester method module is configured to connect the requester method module with corresponding a local or remote provider method module in advance.

4. The method of claim 1, wherein the provider method module decodes a request message for remote call at a requester method module of a second component and to encode a response message.

5. The method of claim 1, wherein the requester method module includes a remote method proxy module for establishment for a local provider method and for communication with a remote provider method module.

6. The method of claim 1, wherein when the requester method port module is connected to a provider method port module on a same host, each requester method module registered in the requester method port module is connected directly to a provider method module on the same host through a connection point for a local provider method module.

7. The method of claim 6, wherein the 5 requester method module is called in the same operation as calling of a provider method module on a second component.

8. The method of claim 1, wherein said establishing the requester method port module includes:
when the requester method port module is connected to a provider method port module on a second host, establishing a method port connector module in a remote method proxy module that exists within each requester method module registered in the requester method port module;
converting a calling of the requester method module into a remote request message to be transferred to a message processor on the second host; and
calling a function of the corresponding provider method module.

9. The method of claim 8, wherein the remote method proxy module encodes a request message for remote calling with reference to a class definition, and decodes a response message from the remote provider method module to return a decoded message to an original caller.

10. A method port arrangement for robot software component, comprising:
a provider method port module, comprising at least one processing device, which includes a set of methods as specific functions to be provided by the robot software component;
a requester method port module which includes a set of methods as specific functions to be used by the robot software component;
a provider method module which is registered in the provider method port module to have one to one correspondence with respective methods provided by the robot software component, and calls the respective methods through the provider method port module; and
a requester method module which is registered in the requester method port module to have one to one correspondence with respective method interfaces provided by the requester method port module, and performs a direct call when the corresponding method interface is on a same host and a remote method call by sending a message over a network channel when the corresponding method interface is on a remote host.

11. The method port arrangement of claim 10, further comprising:
a remote method proxy module for executing message encoding and decoding functions for remote method calling;
a method port connector module for executing communications between components by configuring a message format between ports when a provider method port of a second component corresponding to the requester method port module is arranged at a remote host;
a method port management module for processing a request for a provider method port from the outside of the component or a search request for connection between ports;
a provider method generator for generating the provider method module from a specific method of instance of a specific class; and
a requester method requester for generating the requester method module from a specific method definition of a specific class, together with a remote method module upon generation of the requester method module.

* * * * *